May 2, 1944.    J. LEDWINKA    2,348,078
BRAKE MECHANISM
Filed Jan. 20, 1942    2 Sheets-Sheet 1
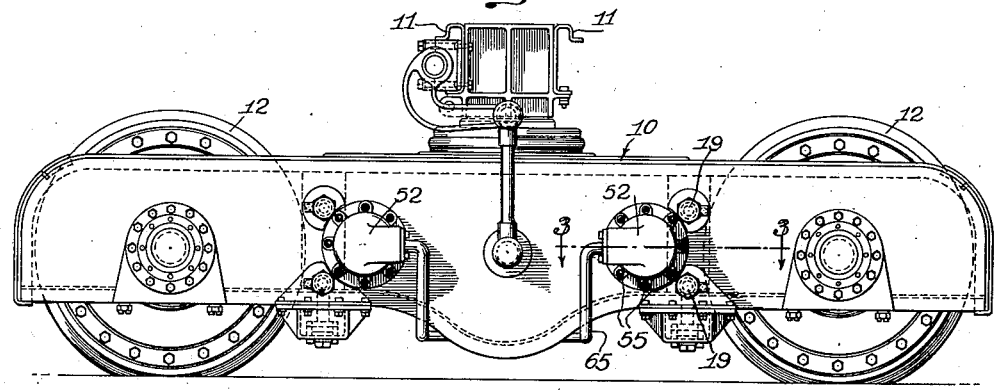
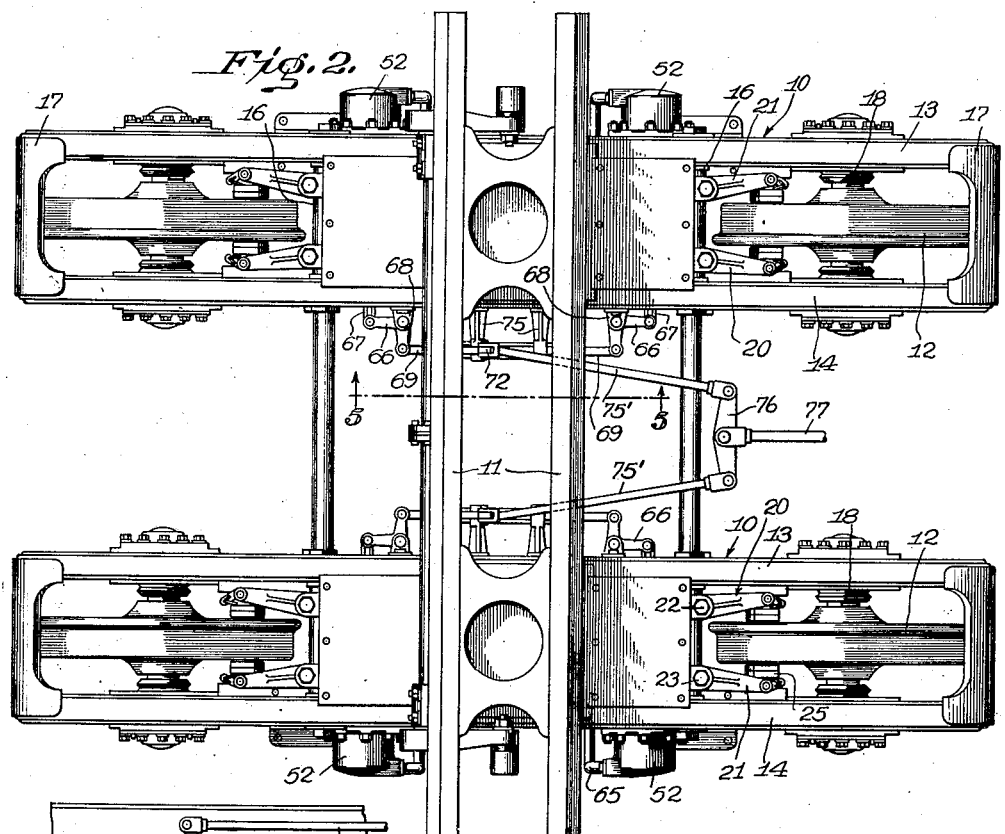
INVENTOR
Joseph Ledwinka
BY John P. Barbey
ATTORNEY May 2, 1944.  J. LEDWINKA  2,348,078
BRAKE MECHANISM
Filed Jan. 20, 1942  2 Sheets-Sheet 2
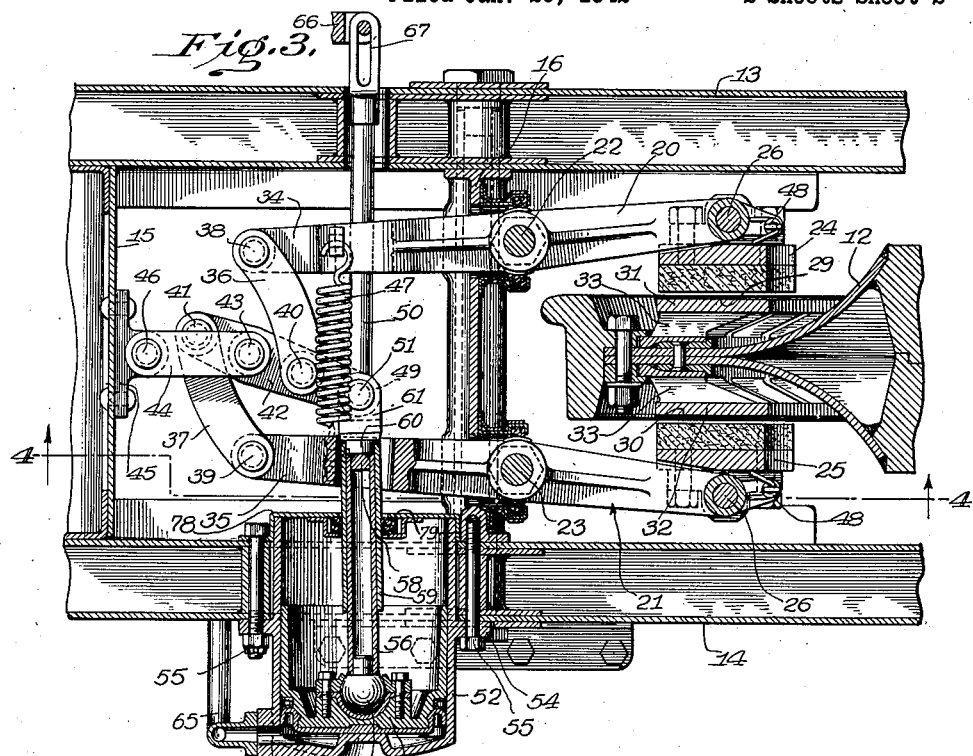
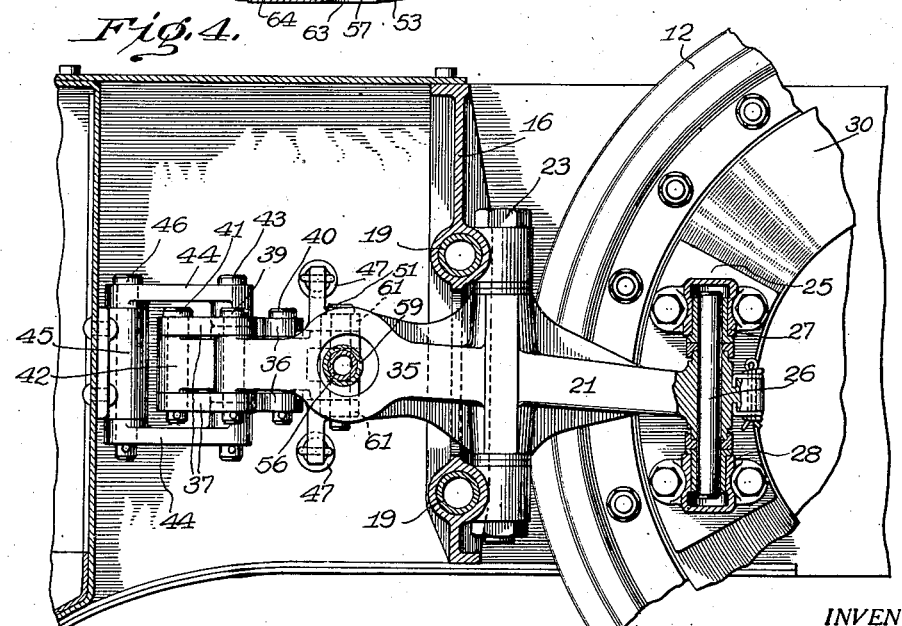
INVENTOR
Joseph Ledwinka
BY
ATTORNEY Patented May 2, 1944

2,348,078

UNITED STATES PATENT OFFICE 2,348,078

BRAKE MECHANISM

Joseph Ledwinka, Philadelphia, Pa., assignor to Budd Wheel Company, Philadelphia, Pa., a corporation of Pennsylvania Application January 20, 1942, Serial No. 427,407

15 Claims. (Cl. 188—59)

The invention relates to brake mechanism, and, more particularly, to such mechanisms adapted to be associated with trucks having tandem wheels arranged between longitudinal girders forming the main members of the truck frame.

It is an object of the invention to provide a simple and inexpensive such brake mechanism, in which the brake parts and their actuating means are readily assembled and disassembled with the truck frame.

It is a particular object of the invention to provide simplified actuating means for the brake shoes connected to be actuated either by fluid pressure or manually and to provide for the ready assembly and disassembly of said fluid and manual means with the truck frame.

These objects are in large part attained by mounting the rotary brake parts on opposite sides of a wheel and by mounting the brake shoes cooperating therewith and their actuating levers on a transverse member of the truck frame interconnecting the spaced girders and to provide for the ready mounting and dismounting this transverse member carrying the shoes and their actuating levers, it is connected to the spaced girders in a manner to permit its easy assembly or disassembly therewith. Other features whereby the objects of the invention are attained are the provision of a common and floating lever and linkage means interconnecting the brake levers of the shoes associated with a wheel for actuating them, and the provision of manual and fluid actuated means for operating said common floating lever and linkage independently. To provide compactness of construction the fluid and manual actuating means are arranged to extend transversely of the girders, one being removably secured to one of the girders and the other being similarly mounted on the other girder. The actuating cylinder for the fluid actuation is in particular so mounted that it can be readily disassembled from the truck frame and the remainder of the braking mechanism for ready access to the piston of said cylinder for replacement of the packing or for any other reason.

Other and further objects and advantages and the manner in which they are attained will become apparent from the following detailed description when read in connection with the accompanying drawings forming a part hereof.

In the drawings:

Fig. 1 is a side elevation of a truck showing the invention applied thereto.

Fig. 2 is a plan view thereof.

Fig. 3 is an enlarged fragmentary horizontal sectional view taken substantially along the line 3—3 of Fig. 1, looking in the direction of the arrows at the ends of the section line.

Fig. 4 is a similarly enlarged fragmentary vertical longitudinal sectional view taken substantially on the line 4—4 of Fig. 3, looking in the direction of the arrows at the ends of the section line.

Fig. 5 is a fragmentary inside elevational view of the central portion of an inside girder of the truck frame showing parts of the manual operating means mounted thereon, as it would appear looking in the direction of the arrows at the end of the line 5—5 of Fig. 2.

The brake mechanism of the invention is shown applied to a truck structure of the type shown in my co-pending application Serial No. 417,991, filed November 6, 1941, in which two trucks, as 10, are individually pivotally connected to the car body represented by the bolster sills 11 intermediate their ends and carry, adjacent their ends the independently rotatably mounted wheels, as 12. Since the brake mechanism associated with the respective wheels is substantially the same for each, only one such mechanism is illustrated in detail in the drawings and the description will be mainly limited thereto.

The support of the rotary brake rings from the wheel and the manner of mounting the shoes and their operating levers on the truck frame may be substantially the same as that shown in copending application, Serial No. 419,116, filed November 14, 1941.

As shown, each truck comprises a spaced pair of longitudinally extending, vertically deep, transversely narrow girders or frame members designated 13 and 14 which are interconnected by transverse members 15, 16 and 17. Each wheel 12 is mounted on an axle 18 running in bearings mounted in the girders, to rotate in the space between the girders and the intermediate transverse member 16 is arranged close to the inner side of the wheel and serves, in addition to a strong interconnection between the girders, as a brake support. This intermediate member 16 may be and preferably is a casting vertically of substantially the depth of the girders and is readily removably secured with certain of the brake parts assembled therewith, as a unit, to the girders 13 and 14, as by upper and lower through bolts 19.

Brake levers 20 and 21 passing longitudinally through openings in the member 16 are pivoted thereon through vertical pins 22 and 23, respectively, each passing through vertically spaced bearings on member 16 and the hub of the adjacent lever disposed between said bearings. Each of the levers 20 and 21 carries at its end adjacent the associated wheel 12 a segmental brake shoe. The shoes are designated respectively 24 and 25 and each is secured to its lever by a vertical pin 26 passing through the enlarged end of the lever and having its ends mounted in upper and lower bearing caps 27 and 28 bolted to the back of the associated shoe. The shoes 24 and 25 are arranged in cooperative relation to braking faces 29 and 30 on braking rings 31 and 32 secured respectively to the opposite faces of the wheel 12, to rotate therewith and permit radial expansion thereof in the manner substantially as shown and described in the afore-mentioned application Serial No. 419,116. The brake rings are further provided with radial passages 33 for the passage of cooling air.

It is to the following structure for actuating the shoes into braking engagement with the braking surfaces on the wheels that the invention is primarily directed. The arms 34 and 35 of the levers 20 and 21, projecting from the opposite side of their pivots from the arms by which the shoes are carried, are interconnected for simultaneous operation by either a fluid pressure operated cylinder and piston or by a manually operated actuator as follows.

Links 36 and 37 are pivotally connected by pins 38 and 39 to the ends of the arms 34 and 35, respectively, and the opposite ends of these links are connected by pins 40 and 41 to a floating lever 42 pivoted at a point equidistant from the pins 40 and 41, by a pin 43 to a link 44, the opposite end of the link 44 being pivoted through the pin 46 to a bracket 45, secured, as by rivets, to the cross member 15 of the frame.

It will be understood, as shown in the drawings, that the links 36 and 37 are in pairs arranged above and below the levers which they connect and spaced to permit the levers to swing between them. Link 44 is likewise comprised of a pair of vertically spaced parts so spaced as to permit the link 37 and its connection to the lever 42 to swing between them, see Fig. 4.

Normally the parts are in the position shown in Fig. 3, with the lever arms 34 and 35 drawn toward each other by the springs, as 47, interconnecting them. In this position, the brake shoes are withdrawn from the braking surfaces on the wheel and are maintained in a position substantially paralleling said faces by coil springs, as 48. Lever 42 extends beyond the pivot 40 connecting it to the link 36 and the end of this extension is bifurcated, see Fig. 4, to receive between the furcations an eye 49 at the end of a transversely extending actuating rod 50. Since the lever 41 is arranged between the lever arms 34 and 35 substantially in the plane thereof to secure a balanced arrangement, the rod 50 passes directly through lever arm 34 through an enlarged opening therein permitting freedom of movement between the rod and lever arm. This rod is also extended out through a large opening in the side girder 13 of the frame and is connected for the manual actuation of the brake, the rod being connected at its inner end through its eye 49 to the furcations of the lever 42 by the vertical pin 51.

For the fluid actuation, a cylinder 52 having a piston 53 movable therein is removably secured to the outside member 14 of the frame. The cylinder is shown received within an opening in the frame through which it extends and is removably secured through a flange 54 thereon and arranged intermediate its ends by an annular series of bolts or studs 55. Bolts are used where space is available on the inside of the member for the heads of the bolts. Where the transverse member 16 is in line with the securing means a stud is used screwing into the member 16, see Fig. 3.

The bore of the cylinder is, as shown, substantially in transverse alignment with the manually actuated rod 50 and the piston 53 of the cylinder 52 is connected by a lost motion connection to the end of the lever 42 and the eye 49 of the rod 50. This connection passes through an enlarged opening in the adjacent lever arm 35 in a manner similar to the passage of rod 50 through lever arm 34 and comprises a tubular strut 56 connected, as by a ball and socket connection 57, to the piston 53 and having its opposite end closed by a plug 58. The strut 56 is in telescoping sliding engagement with a tubular sleeve 59 secured to a plug 60, which has integral therewith upper and lower arms 61 embracing the furcations on the end of lever 42 and secured to it and to the eye 49 of the rod 50 by the common vertical pivot pin 51.

From this it can be seen that the strut 56 and its closing plug 58 merely abut the plug 60 closing the end of sleeve 59, and the manually-actuated rod 50 can be actuated inwardly of the truck from the position shown in Fig. 3 without moving the piston and its piston strut. When the piston is actuated inwardly from the position of Fig. 3, to actuate the brake shoes into braking engagement the rod 50 will also be moved inwardly. As shown in Fig. 3, the piston normally abuts against a central stop 63 on the cylinder head so as to leave a space between it and the head subject to the action of the fluid under pressure admitted to said space through a port 64.

The ports 64 of the various cylinders may be interconnected, the two on the same truck by a rigid piping, as 65, detachably connected to the adjacent cylinder and the rigid piping of the opposite truck by a flexible piping (not shown) so that all the cylinders may be operated from a common source of compressed fluid, such as compressed air. All of the brakes on the four wheels may also be interconnected for manual operation in the manner now to be described. As shown in Figs. 2 and 5, each of the rods 50 is connected at its outer end to a bell crank lever 66 by a pin and slot connection 67. Each bell crank 66 is pivoted to a bracket 68 secured to the inner girder member 13 of a truck frame. The inwardly extending arms of the bell cranks 66 on the same truck 10 are secured by links 69 to spaced points 70, 71 of a floating lever 72 arranged in a vertical plane and pivotally mounted at 73 midway between the points 70, 71 to a longitudinally slidable bar 74. This bar 74 is mounted to slide in spaced brackets 75 secured to and extending inwardly from the girder 13. The lever 72 is extended upwardly, above point 71 and has its upper end connected to a link 75', the opposite end of the link being connected to one end of an equalizer bar 76. The corresponding end of a similar link 75' from the brake mechanism of the opposite truck is connected to the opposite end of said bar. The center of the bar is connected to the usual pull rod 77 for operating the brakes manually or by any suitable emergency actuator.

The operation of the brakes will now be briefly described. For the fluid pressure operation, fluid under pressure is introduced through the piping 65 into each cylinder 52 through its port 64, thus forcing the piston 53 toward the inner end of the cylinder and through the strut 56 moving the end of the floating lever 42 to swing it about its pivot 43 and through the links 37 and 40 actuating the levers 20 and 21 to apply the brakes. Equalization of the pressures on both shoes associated with a wheel is assured by reason of the floating connection of the lever 42 through the link 44 to the frame member 15. Upon this actuation the rod 50 is also moved inwardly by reason of its connection to the lever 36 but this is without effect upon the associated bell crank 66 and the connection to the pull rod 77 by reason of the pin and slot connection 67 between rod 50 and its associated bell crank.

For the manual or emergency actuation, a pull on the pull rod 77 applies equal pull to the links 75' extending to the opposite trucks 10 through the equalizer bar 76. The pull is equally distributed from a link 75' to the brakes of the two wheels of a truck through the longitudinally slidably mounted vertical levers 72, links 69, bell cranks 66 and rods 50 associated with the respective brakes of a truck. The lateral movement of each rod 50 actuates the floating lever and links connecting the brake levers in the same manner as does the piston and piston rod. In this movement, however, by reason of the telescoping sliding connection between piston strut 56 and the sleeve 59 surrounding it and movable with the rod 50, the piston may remain stationary.

Thus it will be seen that the manual or emergency and the normal fluid actuation are for the most part independent one from the other, yet each is adapted to actuate the shoes through a common lever and link mechanism interconnecting the actuating levers of the shoes. A very compact arrangement of brake mechanism is thus assured and one which is housed for the most part between the vertically deep side girders of the frame.

To remove a cylinder from the assembly for repacking of the piston or for other reason, all that is necessary is to remove the bolts or studs 55, which also secure in place the closing cap 78 for the inner open end of the cylinder 52, this closing cap having a packing gland 79 surrounding the sleeve 59, and then withdrawing the cylinder 52 and piston 53 with its attached strut 56 laterally from its opening in the girder 14. The sleeve 59 and cap 78 will remain in position upon such withdrawal. It will be understood, of course, that the detachable rigid pipe connection to the cylinder is also first released before its withdrawal.

Though only a single form of the invention is illustrated and described the invention is not limited thereto but may be embodied in various forms as desired. As various changes in construction and arrangement of parts may be made without departing from the spirit of the invention as will be apparent to those skilled in the art, reference will be had to the appended claims for a definition of the limits of the invention.

What I claim is:

1. In a brake mechanism for trucks having spaced side girders between which is rotatably mounted a wheel to be braked, brake mechanism for said wheel comprising a pair of rotary braking faces rotating with said wheel, a pair of brake shoes arranged in cooperative relation to the respective faces and carried respectively by brake levers, a pivotal support for said levers intermediate their ends, actuating means for said levers including a fluid actuated cylinder supported in an opening in one of said side girders and having its axis disposed transversely thereof.

2. In a brake mechanism for trucks having spaced side girders between which is rotatably mounted a wheel to be braked, brake mechanism for said wheel comprising a support rigidly interconnecting said girders adjacent said wheel, actuating levers mounted intermediate their ends on said support through vertical pivots, brake shoes carried by the respective levers at one of their ends and associated with rotary braking elements rotating with the wheel, a floating lever connected by links to the opposite ends of said actuating levers, and manual and fluid pressure means connected to actuate said floating lever and apply the brakes.

3. In a brake mechanism for trucks having spaced longitudinal griders, a wheel mounted for rotation between said girders and brake mechanism for said wheel comprising longitudinally extending brake levers mounted in laterally spaced relation on a support connecting said girders to rotate about a vertical axis, shoes carried at one of the ends of the respective levers, and actuating means associated with the opposite ends of said levers including a chain of elements extending transversely of the levers and having connections at opposite ends, respectively, with a manual actuating means and at the other end with a fluid actuated cylinder means, and lost motion connections permitting actuation by one of said actuating means independently of the other.

4. In a truck having a longitudinal frame member and a wheel rotatably disposed on one side of said member, a brake mechanism for said wheel comprising a braking element rotatable with the wheel, a brake shoe in cooperative relation with said element and carried by an actuating lever extending longitudinally alongside said frame member on the same side as the wheel, a cylinder and piston for actuating said lever, the cylinder extending through an opening in said member and being readily removably secured to the opposite face of said member from the wheel, and removable with the piston through said opening upon removing the securing means.

5. In a truck having a frame, and a wheel to be braked, a brake mechanism comprising a pair of spaced braking faces rotatable with the wheel, a pair of brake levers pivoted intermediate their ends upon the frame and carrying brake shoes at one of their ends for cooperation with the respective braking faces, and means connected with the opposite ends of said levers for actuating them to apply the brakes, said means comprising a floatingly mounted lever disposed between the actuating levers and links connecting said floatingly mounted lever at points equidistant from its mounting to the respective actuating levers.

6. In a truck having spaced longitudinal girders mounting tandem wheels, one adjacent each of the opposite ends thereof, brake mechanism associated with each wheel of said tandem wheels, and comprising for each wheel a pair of rotary braking elements rotating with the associated wheel, a pair of brake shoes, one associated with each of said rotary braking elements, and actuating levers for and carrying the respective shoes at one of their ends and having means interposed between their opposite ends for actuating them to apply the brakes, said actuating means including a transversely movable rod having its end projecting from a face of one of said girders, and equalizing means mounted on said face of the girder and connecting the transversely movable rods associated with the brake mechanisms of the respective wheels for equalizing the braking action on the respective wheels.

7. In a truck, a frame having an opening and a wheel to be braked, brake mechanism for said wheel comprising braking faces rotating with the wheel and brake shoes in cooperative relation with the respective faces, actuating levers mounted on the frame between their ends and carrying the respective shoes on one of their ends, the opposite ends of said levers having actuating means interposed therebetween including a transversely extending thrust member and a cylinder and piston for actuating said member, the cylinder and piston being removably mounted in the frame opening and adapted to be removed therefrom and readily disassociated from said thrust member by removal of the cylinder from said opening.

8. In a truck having spaced longitudinal frame members mounting tandem wheels, one adjacent each of the opposite ends thereof, brake mechanism associated with each wheel of said tandem wheels and comprising a braking element rotatable with the associated wheel, a braking shoe associated with said braking element and actuating means for said shoe including a transversely movable rod having its end projecting from a face of one of said frame members, and equalizing means mounted on said face of the frame member and interconnecting the transversely movable rods associated with the brake mechanisms of the respective wheels for equalizing the braking action on the wheels.

9. In a truck having spaced longitudinal frames, each frame supported by tandem wheels arranged, respectively, near the ends thereof, brake mechanism for each of said wheels comprising a brake member rotatable with a wheel, a non-rotary brake shoe supported on the associated frame in cooperative relation with said rotary brake element and actuating means for said brake shoe having a part movable transversely of the frame and projecting from the inner face of the associated frame, equalizing means for applying the brakes of all said wheels, including equalizing devices interconnecting the transversely movable actuating parts associated with the brake mechanisms of the tandem wheels of each longitudinal frame and carried by the inner face thereof and an equalizing bar interconnecting the equalizing devices associated with the respective spaced frames.

10. In a truck, a longitudinally extending frame member having an opening and a wheel disposed on one side of said member, brake mechanism for said wheel comprising a disc-like braking member rotating with the wheel, a non-rotary brake member disposed in cooperative relation to said rotating braking member and carried by a longitudinally extending brake lever pivotally supported by the frame, means for actuating said lever including a fluid-operated cylinder and piston, and a lost motion connection between said piston and said lever, the cylinder being removably mounted in said opening and adapted to be removed from said opening with the piston without disturbing the rest of the brake mechanism.

11. In a truck having a longitudinally extending frame member and a wheel disposed adjacent one end thereof, brake mechanism for said wheel comprising disc-like braking faces rotatably associated with said wheel, brake shoes operatively associated with the respective braking faces and each carried by a longitudinally extending brake lever pivoted intermediate its ends on the frame, means for actuating the levers interposed between their ends remote from the shoes, said means including a lever pivotally mounted for transverse floating movement on the frame and links connecting the floating lever on opposite sides of its pivot with the brake levers, respectively.

12. In a truck having a longitudinally extending frame member and a wheel disposed adjacent one end thereof, brake mechanism for said wheel comprising a spaced pair of disc-like braking faces rotating with the wheel, brake shoes operatively associated with the respective braking faces and each carried by a longitudinally extending brake lever pivoted intermediate its ends on the frame, means for actuating said levers interposed between their ends remote from said shoes, said means including a floating lever pivotally supported intermediate its ends by a link pivoted on the frame, and interconnected on opposite sides of its pivot and equidistant therefrom with the respective brake levers by additional links.

13. In a truck having a longitudinally extending frame member and a wheel disposed adjacent one end thereof, brake mechanism for said wheel comprising disc-like braking faces rotatably associated with the wheel, brake shoes operatively associated with the respective braking faces, and each carried by a longitudinally extending brake lever pivoted intermediate its ends on the frame, means for actuating said levers interposed between their ends remote from the shoes, said means including a generally longitudinally extending lever pivotally mounted for transverse floating movement on the frame, links connecting said floating lever at points equidistant from the opposite sides of its pivot to the brake levers, and means for actuating said floating lever extending generally transversely of the frame.

14. In a truck having spaced longitudinal frame members with a wheel mounted between them, brake mechanism for said wheel comprising disc-like braking faces rotatably associated with the wheel, brake shoes operatively associated with the respective braking faces and each carried by a longitudinally extending brake lever pivoted intermediate its ends on the frame, means for actuating said brake levers to apply the brakes arranged between their ends remote from said shoes, including a longitudinally extending lever pivotally carried by the frame to swing transversely, brake cylinder means arranged to actuate said lever and mounted on one of said frame members, and emergency means for actuating said lever mounted on the other of said frame members.

15. In a brake mechanism for a railway truck, a wheel provided with a braking surface, a braking mechanism including a brake shoe, an actuating rod connected to said mechanism, separate manual and fluid pressure operating means for operating said rod, and a separate lost motion connection between each of said operating means and said rod permitting selective and independent operation of said rod by either of said means.

JOSEPH LEDWINKA.